United States Patent Office 3,535,551
Patented Oct. 20, 1970

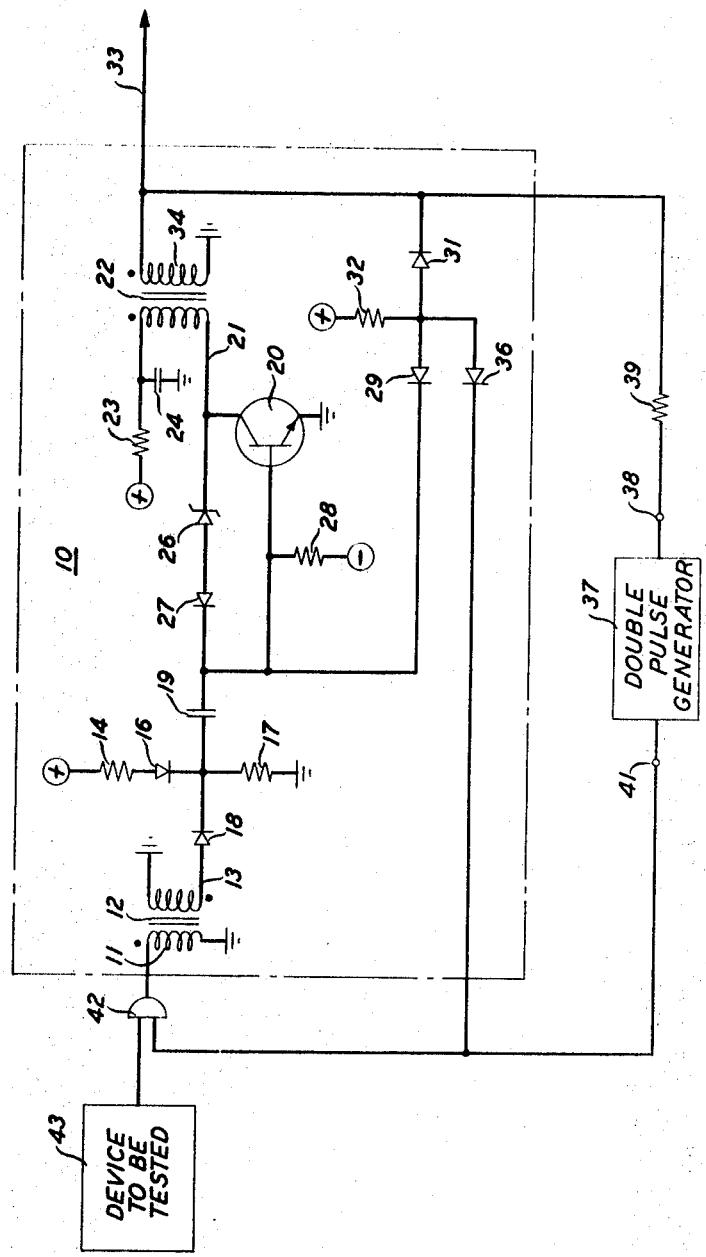

3,535,551
SYSTEM FOR ALTERING THE TRIGGERING LEVEL OF A FIXED LEVEL SIGNAL DETECTOR
Cyrus F. Ault, Wheaton, Ill., assignor to Bell Telephone Laboratories, Incorporated, Murray Hill and Berkeley Heights, N.J., a corporation of New York
Filed Nov. 16, 1967, Ser. No. 683,565
Int. Cl. H03k 17/00
U.S. Cl. 307—235　　　　　　　　　　　　　　　7 Claims

ABSTRACT OF THE DISCLOSURE

The triggering level of class of fixed level signal detectors is momentarily altered by applying a pulse to the output terminal of the signal detector.

FIELD OF THE INVENTION

This invention relates to a circuit for checking signal level fidelity in a data system and particularly to a circuit for transiently modifying the triggering level of a circuit normally having a fixed triggering level.

BACKGROUND OF THE INVENTION

A binary data signal provided by a device nominally assumes one of two prescribed signal levels. In practice, however, the actual signal provided deviates from these signal levels. To determine whether the actual signal deviation from the nominal levels exceeds a predetermined value, a standard test signal pattern may be repeatedly generated by the device while a discriminating level of a digital signal detector is varied. If the output of the digital signal detector is identical for each of the test signals, the actual binary data signal levels provided by the device are within the prescribed tolerances.

Often it is desirable to run such checks on an existing data system already incorporating a fixed level digital signal detector. Several straightforward approaches are available for varying the discriminating level of fixed level digital signal detectors. Each of these approaches, however, require mechanical alterations of the fixed level digital signal detector, for example, changing a resistance value. When one has a large number of fixed level signal detectors, it becomes uneconomical to make these mechanical alterations.

BRIEF DESCRIPTION OF THE INVENTION

In accordance with this invention, a fixed level digital signal detector, in which the fixed level is determined by a voltage stored on a capacitor connected between an input reference point and an input terminal of an amplifier having nonlinear negative feedback, is modified by driving a pulse into the output of the amplifier. The pulse is poled to inhibit the negative feedback thereby charging the capacitor with the bias current normally driving the amplifier. Upon termination of the pulse, the nonlinear feedback restores the input of the amplifier to its quiescent voltage resulting in a transient alteration of the voltage at the input reference point.

In one embodiment, the amplifier is included in a blocking oscillator circuit. The positive feedback loop of the blocking oscillator is inhibited during the pulse applied to the output to prevent the blocking oscillator from triggering therefrom.

DESCRIPTION OF THE DRAWING

A more thorough understanding of this invention will be obtained by reference to the following specification and drawing in which the single figure is a circuit diagram partly in block form of a system constructed in accordance with the principles of this invention.

THE FIXED LEVEL SIGNAL DETECTOR

A circuit 10 enclosed in dashed lines in the figures is a fixed level signal detector sometimes employed in large digital systems. A signal to be detected, such as a narrow positive pulse, is applied across a primary 11 of a transformer 12 providing a positive pulse with respect to ground on a secondary terminal 13 thereof. A voltage divider including a resistor 14 connected between a positive source of potential and an anode of diode 16 and a resistor 17 connected between the cathode of the diode 16 and ground provides a reference voltage at the cathode of the diode 16. A rectifying diode 18 is connected between the cathode of the diode 16 and the secondary terminal 13 of the transformer 12 in reverse biased polarity. The diode 18, therefore, conducts to pass only those positive pulses provided at the terminal 13 which exceed the reference voltage provided at the cathode of the diode 16. If the pulse does not exceed the reference voltage, no pulse is passed.

A capacitor 19 couples the pulse passed by the diode 18 to the base of transistor 20. The primary 21 of a transformer 22 is connected between the collector of the transistor 20 and a decoupling network including resistor 23 and capacitor 24. The decoupling network is connected to the positive source of voltage through the resistor 23.

A reverse biased Zener diode 26 in series with a forward biased diode 27 is connected between the base and collector of transistor 20 to bias the transistor 20 into its linear operating region. A resistor 28 is connected between the base of transistor 20 and a negative source of voltage to insure that the Zener diode 26 is operating a region beyond the knee of its characteristic curve so that the voltage thereacross is relatively independent of the current gain of transistor 20. It should be apparent that the quiescent bias voltage between the collector and emitter of the transistor 20 is also determined by the Zener diode 26 in series with the diode 27. The quiescent bias curernt flowing in the collector circuit of transistor 20 is determined by the value of the positive source of potential, the Zener diode 26 in combination with the diode 27 and the resistor 23.

A pair of diodes 29 and 31 having a resistor 32 connected between the positive source of potential and their common anodes provides a positive feedback path between the base of transistor 20 and an output terminal 33 on the secondary 34 of the transformer 22. The primary and secondary windings of the transformer 22 are connected to function as an inverter. A diode 36 is connected with its anode common to the anodes of diodes 29 and 31 so that a ground potential applied to the cathode thereof inhibits the positive feedback while a positive potential applied thereto transforms the transistor 20 into a blocking oscillator circuit.

With ground potential on the cathode of diode 36, the narrow positive pulse coupled by capacitor 19 will energize transistor 20 to provide a narrow spike at the output terminal 33. With a positive voltage on the cathode of diode 36 the positive spike passed by the capacitor 19 will again initiate a spike on the output terminal 33 which will in this case, be coupled back to the base of transistor 20. The transistor 20 will then be held on until the core of transistor 20 saturates, thereby providing a wide output pulse It is seen that this gating arrangement is helpful in suppressing wide unwanted output pulses on the output terminal 33 due to spurious input noise signals occurring when an output pulse is not desired.

DETAILED DESCRIPTION OF THE INVENTION

In accordance with this invention, the voltage at the cathode of diode 16, and thereby the minimum voltage required before the diode 18 will pass a positive input pulse, is altered by injecting a pulse back into the output terminal 33 of transformer 22. A positive pulse applied to terminal 33 will provide a negative signal at the collector of transistor 20. This negative signal will reduce the voltage across Zener diode 26 and cause it to exhibit a high impedance condition, thereby removing base drive from transistor 20. The current flowing in the resistor 28 therefore switches from the Zener diode 26 and flows through the parallel combination of the secondary of transformer 12 in series with forward-biased diode 18 and resistor 14 in series with forward-biased diode 16 all in series with capacitor 19. This current integrates to increase the voltage across the capacitor 19 consequently to lower the voltage at the cathode of the diode 27.

When the pulse terminates at the output terminal 33, the transistor 20 is again brought to its quiescent biased condition, bringing the cathode of diode 27 back to the forward-biased base potential of the transistor 20. The additional voltage integrated by capacitor 19 now increases the voltage at the cathode of the diode 16 and back biases that diode so that the triggering level of the circuit is increased for a time determined by the time constant of the capacitor 19 and the resistor 17. It should be apparent that if the feedback loop of the blocking oscillator were closed while the output pulse were applied, the positive pulse would cause the blocking oscillator to regenerate and provide a wide output signal.

A negative pulse applied to the terminal 33 provides a positive signal on the collector of the transistor 20. This positive voltage signal is coupled across Zener diode 26 and diode 27 to increase the voltage at the base of transistor 20. The potential at the collector of the transistor 20 thus tends to be maintained at nearly its original potential. The positive voltage shift required at the base of transistor 20 to maintain the transistor 20 in its quiescent condition is coupled across capacitor 19 thus tending to increase the impedance of the diode 16. Current flowing in the resistor 17, therefore, is now drawn through capacitor 19 which is being held on its other side to the low impedance of diode 27. This current is integrated and tends to decrease the voltage across the capacitor 19.

When the negative pulse is removed from the output terminal 33, the transistor 20 is again brought to its quiescent-bias condition and the cathode of diode 27 is brought back to the forward-biased base potential of transistor 20. The lower voltage now appearing across capacitor 19 decreases the voltage at the cathode of the diode 16 so that the triggering level of the circuit is decreased for a time determined by the time constant of the capacitor 19 and the parallel combination of resistors 14 and 17.

Therefore, we can see that a way has been devised to alter positively and negatively the triggering level of this fixed level signal detector without mechanically altering the circuit. To this end, a commercially available double pulse generator 37 is provided to supply an output pulse at a terminal 38. The pulse on the terminal 38 may be either positive or negative as desired, or may be programmed to be alternately, sequentially or selectively positive or negative. A resistor 39 is connected between the output terminal 38 of the double pulse generator 37 and the output terminal 33 of the transformer 22 so that while the pulse may be injected from the double pulse generator 37 into the output terminal 33 of the transformer 22, signals generated by the circuit 10 will not be loaded down by the double pulse generator 37.

A positive pulse is provided by the double pulse generator 37 on a delayed pulse output terminal 41. The delayed pulse on the terminal 41 is positive no matter what the polarity of the pulse on the terminal 38 may be. This pulse is initiated a time after the completion of the pulse on the terminal 38. This delayed pulse is applied to the cathode of diode 36 to close the positive feedback loop and enable transistor 20 to function as a blocking oscillator. This pulse is also applied to a gating circuit 42 for passing a digital signal provided by a device-to-be-tested 43 only at those times when the level of the circuit 10 has been modified. It should be clear that the signal appearing on terminal 41 can be passed through another gate before being applied to diode 36 or gate 42 so that the signal level detector circuit 10 can also be operated at its fixed level.

It should be understood that the above-described arrangements are merely illustrative of the application of the principles of the invention. Numerous other arrangements may be devised by those skilled in the art without departing from the spirit and scope of the invention.

What is claimed is:

1. A method of altering the triggering level of a circuit having an input and an output; said circuit including.
   a capacitor having first and second plates;
   means connected to said first plate for biasing said first plate to a first voltage level;
   a diode connected between said input and said first plate, said diode being connected in reverse biased polarity relative to said first voltage level;
   a negative feedback amplifier having an input terminal and an output terminal;
   means for connecting said second plate to said input terminal of said amplifier; and
   means for connecting said output terminal of said amplifier to said output of said circuit;
   comprising the step of:
      applying a pulse for a predetermined time to the output of said circuit.

2. The method as described in claim 1 including the additional step of:
   applying a second pulse to said input of said circuit after the expiration of said predetermined time.

3. In combination with a circuit having an input and an output said circuit including:
   a capacitor having first and second plates;
   means connected to said first plate for biasing said first plate to a first voltage level;
   a diode connected between said input and said first plate said diode being connected in reverse biased polarity relative to said first voltage level;
   a negative feedback amplifier having an input terminal and an output terminal;
   means for connecting said second plate to said input terminal of said amplifier; and
   means for connecting said output terminal of said amplifier to said output of said circuit; and
   the additional element of:
      means connected to said output of said circuit for applying a pulse for a predetermined time to said output of said circuit.

4. The combination as defined in claim 3 also including:
   means for applying a second pulse to said input of said circuit after the expiration of said predetermined time.

5. The combination as defined in claim 3 also including:
   means connected to the output of said circuit for inverting signals applied thereto; and
   means responsive to said inverting means rendered effective by a control signal for driving said input terminal of said amplifier.

6. The combination as defined in claim 5 also including:
   means for applying said control signal to said driving means after the expiration of said predetermined time.

7. The combination as defined in claim 6 in which said control signal is a second pulse also including:

means for applying said second pulse to said input of said circuit.

References Cited
UNITED STATES PATENTS

| | | | |
|---|---|---|---|
| 2,973,440 | 2/1961 | Trent | 307—235 |
| 3,002,154 | 9/1961 | Schmitz et al. | 328—150 XR |
| 3,048,715 | 8/1962 | Horton | 328—150 XR |
| 3,173,095 | 3/1965 | Wagner | 307—235 XR |
| 3,248,570 | 4/1966 | Gaunt | 307—235 |

STANLEY T. KRAWCZEWICZ, Primary Examiner

U.S. Cl. X.R.

307—317; 328—150